(12) United States Patent
Heuver et al.

(10) Patent No.: US 9,664,279 B2
(45) Date of Patent: May 30, 2017

(54) FRICTION ELEMENT ASSEMBLY FOR A TRANSMISSION AND METHOD OF ASSEMBLY

(71) Applicant: Ford Global Technologies, LLC, Dearborn, MI (US)

(72) Inventors: Bradley Ronald Heuver, South Lyon, MI (US); Mark William Marchie, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 14/294,192

(22) Filed: Jun. 3, 2014

(65) Prior Publication Data
US 2015/0345635 A1  Dec. 3, 2015

(51) Int. Cl.
| F16H 63/30 | (2006.01) |
| F16D 13/68 | (2006.01) |
| F16D 13/32 | (2006.01) |
| F16D 55/36 | (2006.01) |
| F16H 57/08 | (2006.01) |
| F16D 13/70 | (2006.01) |
| F16D 25/0638 | (2006.01) |
| F16D 13/52 | (2006.01) |

(52) U.S. Cl.
CPC ......... *F16H 63/3026* (2013.01); *F16D 13/52* (2013.01); *F16D 13/683* (2013.01); *F16D 13/70* (2013.01); *F16D 25/0638* (2013.01); *F16D 55/36* (2013.01); *F16H 57/08* (2013.01); *F16D 2300/12* (2013.01); *F16H 2057/087* (2013.01); *Y10T 29/49872* (2015.01)

(58) Field of Classification Search
None
See application file for complete search history.

(56) References Cited

U.S. PATENT DOCUMENTS

| 2,544,631 | A | | 3/1951 | Heimann et al. |
| 2,869,910 | A | | 1/1957 | Fisher et al. |
| 2,968,503 | A | | 10/1958 | Ferrara et al, |
| 3,362,481 | A | * | 1/1968 | Steinhagen ......... F16D 25/0638 |
| | | | | 192/106 F |
| 3,877,321 | A | | 4/1975 | Storer |

(Continued)

FOREIGN PATENT DOCUMENTS

| KR | 10-0188650 | * | 9/1998 |
| KR | 101013894 | | 2/2011 |
| WO | 2014001211 | | 1/2014 |

*Primary Examiner* — Colby M Hansen
(74) *Attorney, Agent, or Firm* — Diederiks & Whitelaw, PLC

(57) ABSTRACT

A friction element assembly for a transmission of a motor vehicle includes a set of plates and friction members. A piston assembly is configured to apply a force to the set of plates and friction members. The friction element assembly also includes a housing with a mounting groove; a pressure plate having first and second edges; and a snap ring positioned in the mounting groove. The snap ring is positioned such that first edge of the pressure plate contacts the snap ring and the second edge of the pressure plate extends across a portion of the snap ring. The snap ring is L-shaped and includes a leg portion that contacts the second edge of the pressure plate when the piston assembly applies a force to the set of plates and friction members.

16 Claims, 4 Drawing Sheets

(56) References Cited

U.S. PATENT DOCUMENTS

| | | |
|---|---|---|
| 4,182,579 A | 1/1980 | Berkbigler et al. |
| 8,337,111 B2 | 12/2012 | Pajewski et al. |
| 2011/0000757 A1* | 1/2011 | Muizelaar ............ F16D 13/683 192/70.12 |

* cited by examiner

FRICTION ELEMENT ASSEMBLY FOR A TRANSMISSION AND METHOD OF ASSEMBLY

BACKGROUND OF THE INVENTION

The present invention pertains to a friction element assembly, such as a clutch or brake, for a transmission of a motor vehicle and, more particularly, to a friction element assembly configured to prevent a snap ring, securing the friction element assembly, from exiting a groove provided for the snap ring.

In a typical transmission for a motor vehicle, there are a number of friction element assemblies, such as clutches or brakes, each friction element assembly including multiple plates and friction members. During operation of the vehicle, in order to apply a friction element, a piston assembly contacts and then compresses the plates and friction members together. For this compression to occur, movement of the plates and friction members must be restricted in some way. Generally, a snap ring is provided for this purpose, although other portions of the transmission are sometimes used when allowed by the structure of the transmission.

During assembly of the transmission, the plates and friction members of the friction element assembly are installed followed by the snap ring. To install the snap ring, it is contracted, placed near a groove in a housing of the friction element assembly and then allowed to expand back to its default size such that the snap ring enters the groove. This tendency to expand acts to hold the snap ring in place. However, the snap ring may be deformed by the forces applied to it and thereby exit the groove, especially if the groove is relatively shallow such that a smaller percentage of the snap ring is located within the groove. If the snap ring exits the groove, the friction element assembly cannot be actuated by its piston assembly. In certain friction element assembly configurations, though, it is beneficial to use a shallower groove as this reduces stresses in the housing. Therefore, there is a need in the art for a friction element assembly design that prevents a snap ring thereof from exiting a relatively shallow mounting groove once the snap ring has been installed.

SUMMARY OF THE INVENTION

The present invention is directed to a friction element assembly for a transmission of a motor vehicle that includes a set of plates and friction members. A piston assembly is configured to apply a force to the set of plates and friction members. The friction element assembly also includes a housing with a mounting groove; a pressure plate having first and second edges; and a snap ring positioned in the mounting groove. The snap ring is positioned such that first edge of the pressure plate contacts the snap ring and the second edge of the pressure plate extends across a portion of the snap ring. The first edge of the pressure plate is generally perpendicular to a longitudinal axis of the transmission, while the second edge is adjacent to the mounting groove and generally parallel to the longitudinal axis of the transmission. The snap ring is L-shaped and includes a leg portion that contacts the second edge of the pressure plate when the piston assembly applies a force to the set of plates and friction members.

In one embodiment, the mounting groove is less than 2 mm deep, and is preferably between 1.55 and 1.65 mm deep. In another embodiment, the housing is divided into a plurality of legs and the mounting groove is formed in an inner surface of each of the plurality of legs. The plurality of legs extends through a plurality of plates of the set of plates and friction members.

To assemble the friction element assembly, the pressure plate and the set of plates and friction members are inserted into the transmission so that the set of plates and friction members contacts the piston assembly. Next, the pressure plate and the set of plates and friction members are compressed so that the mounting groove is exposed. The snap ring is then inserted into the groove. After this, the pressure plate and the set of plates and friction members are released so that the first and second edges of the pressure plate contact the snap ring.

Additional objects, features and advantages of the present invention will become more readily apparent from the following detail description of preferred embodiments when taken in conjunction with the drawings wherein like reference numerals refer to corresponding parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
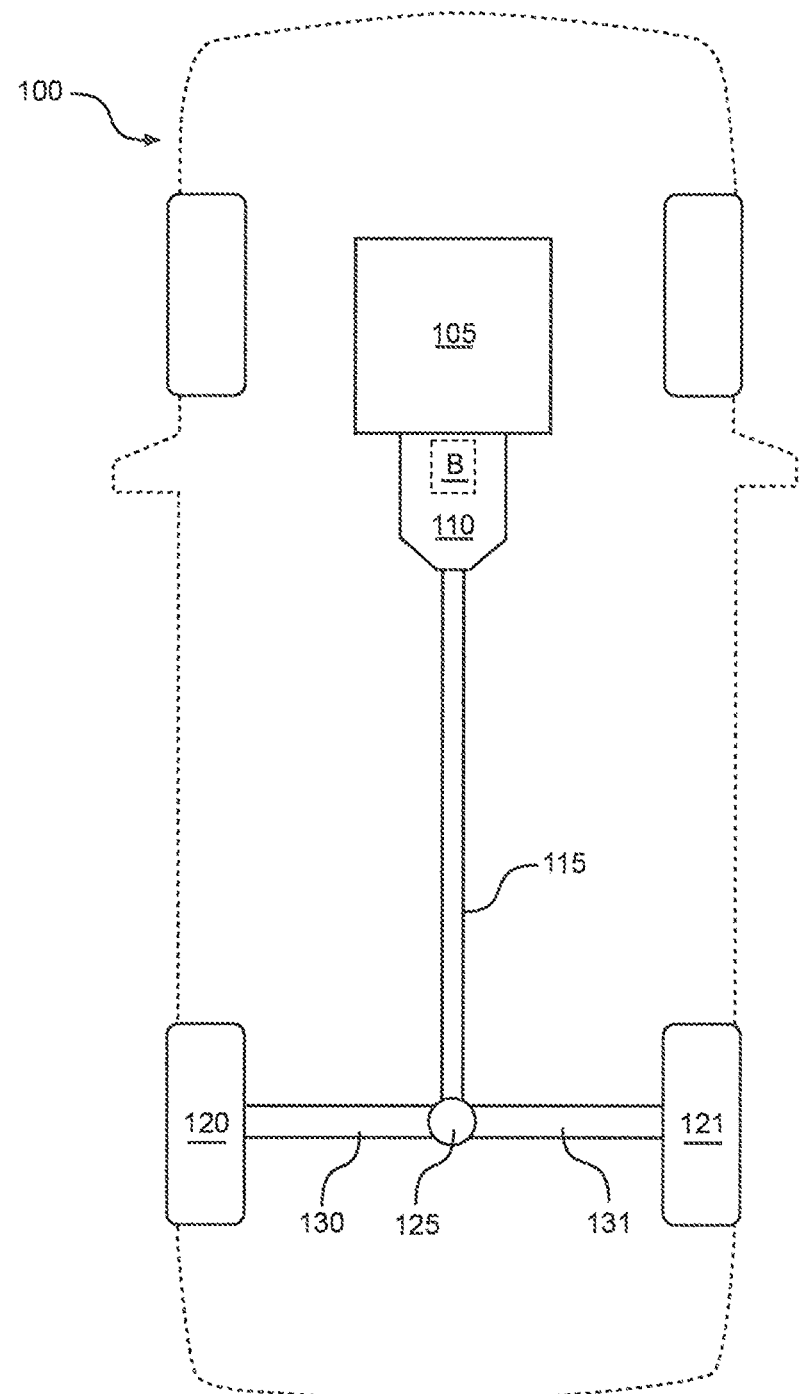
FIGS. 1 is a schematic view of a motor vehicle constructed in accordance with the present invention.

With initial reference to FIG. 1, there is shown a motor vehicle 100 in accordance with the present invention. Vehicle 100 has a power source 105, such as an internal combustion engine or an electric motor, connected to a transmission 110. Transmission 110 includes a variety of friction element assemblies, one of which is a brake B constructed in accordance with the invention as detailed further below. Power is transmitted from power source 105 to transmission 110 and then to a driveshaft 115, which transmits the power to year wheels 120, 121 through a differential assembly 125 and half shafts 130, 131. In such a configuration, vehicle 100 is a rear-wheel drive vehicle. However, additional configurations are usable in connection with the present invention. For example, in other embodiments, vehicle 100 is front-, four- or all-wheel drive. In the four- and all-wheel drive embodiments, vehicle 100 would also include a transfer case, a second driveshaft, a second differential assembly and two more half shafts (not shown). Additionally, power source 105 does not need to be located in a front portion of vehicle 100, but can instead by located elsewhere, as in a rear- or a mid-engine embodiment.

Figure 2:
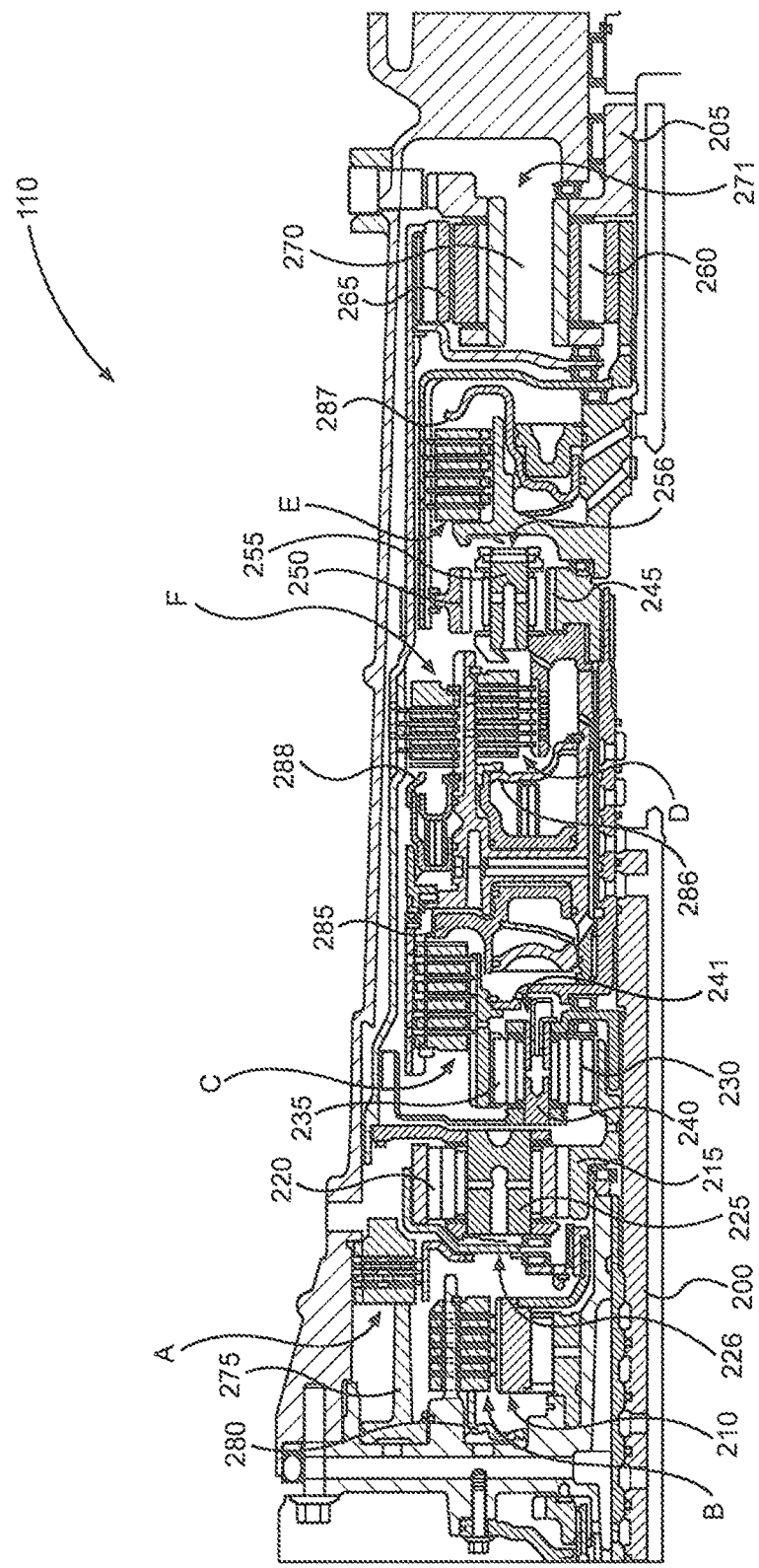
FIG. 2 is a cross-sectional view of a transmission of the motor vehicle of FIG. 1.

Referring now to FIG. 2, transmission 110 is shown in greater detail. In this embodiment, transmission 110 is a ten-speed transmission (i.e., it has ten different forward gear ratios), although the present invention is not limited to use with such a transmission. Transmission 110 includes an input 200, an output 205, a one-way clutch 210, a brake A, brake B, a clutch C, a clutch D, a clutch E, a clutch F, four sets of gears and a piston assembly for each of brakes A and B and clutches C, D, E and F. In general, each of the four sets of gears has a sun gear, a ring gear and at least one planetary gear, which together define a planetary gear set. In particular, FIG. 2 shows a first sun gear 215, a first ring gear 220 and a first planetary gear 225 defining a planetary gear set 226; a second sun gear 230, a second ring gear 235 and a second planetary gear 240 defining a planetary gear set 241; a third sun gear 245, a third ring gear 250 and a third planetary gear 255 defining a planetary gear set 256; and a fourth sun gear 260, a fourth ring gear 265 and a fourth planetary gear 270 defining a planetary gear set 271. Piston assemblies 275 and 280 are associated with brakes A and B, respectively, while piston assemblies 285, 286, 287 and 288 are associated with clutches C, D, E and F, respectively. In general, transmission 110 converts an input torque coming from power source 105 to an output torque going to rear wheels 120, 121 by adjusting a gear ratio (for example, during an upshift or a downshift) between input 200 and output 205. This adjustment is accomplished by applying or releasing the friction element assemblies (i.e., one-way clutch 210, brakes A and B and clutches C, D, E and F) in order to change torque relationships by altering gear configurations of transmission 110. As a result, power flow paths are established and disestablished from power source 105 to rear wheels 120, 121.

Figure 3:
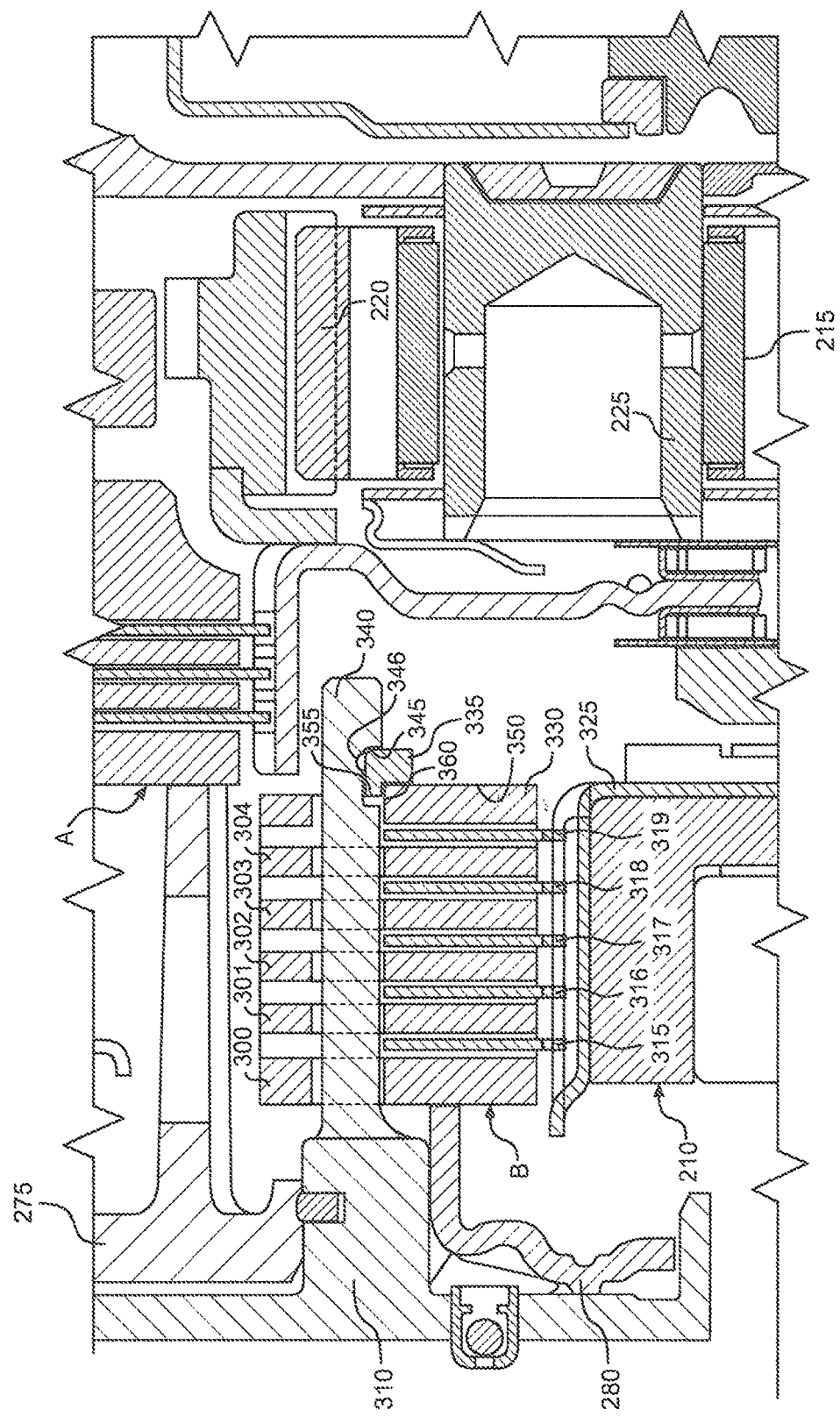
FIG. 3 is a partial cross-sectional view of a friction element assembly of the transmission.

Each of brakes A and B and clutches C, D, E and F includes a plurality of plates and a plurality of friction members. For example, with reference now to FIG. 3, brake B includes plates 300, 301, 302, 303 and 304 coupled to a stationary brake housing 310 through a spline connection and friction members 315, 316, 317, 318 and 319 coupled to a brake drum 325 through another spline connection. To apply brake B, piston assembly 280 is caused to move to the right with respect to FIG. 3. As piston assembly 280 moves to the right, it will contact plate 300, which will contact friction member 315, and eventually apply pressure to all of the interleaved plates 300-304 and friction members 315-319. The rightward movement of plates 300-304 and friction members 315-319 is halted by a pressure plate 330, which is held in place by a snap ring 335. At this point, friction created between plates 300-304 and friction members 315-319 causes brake drum 325 to stop rotating.

Figure 5:
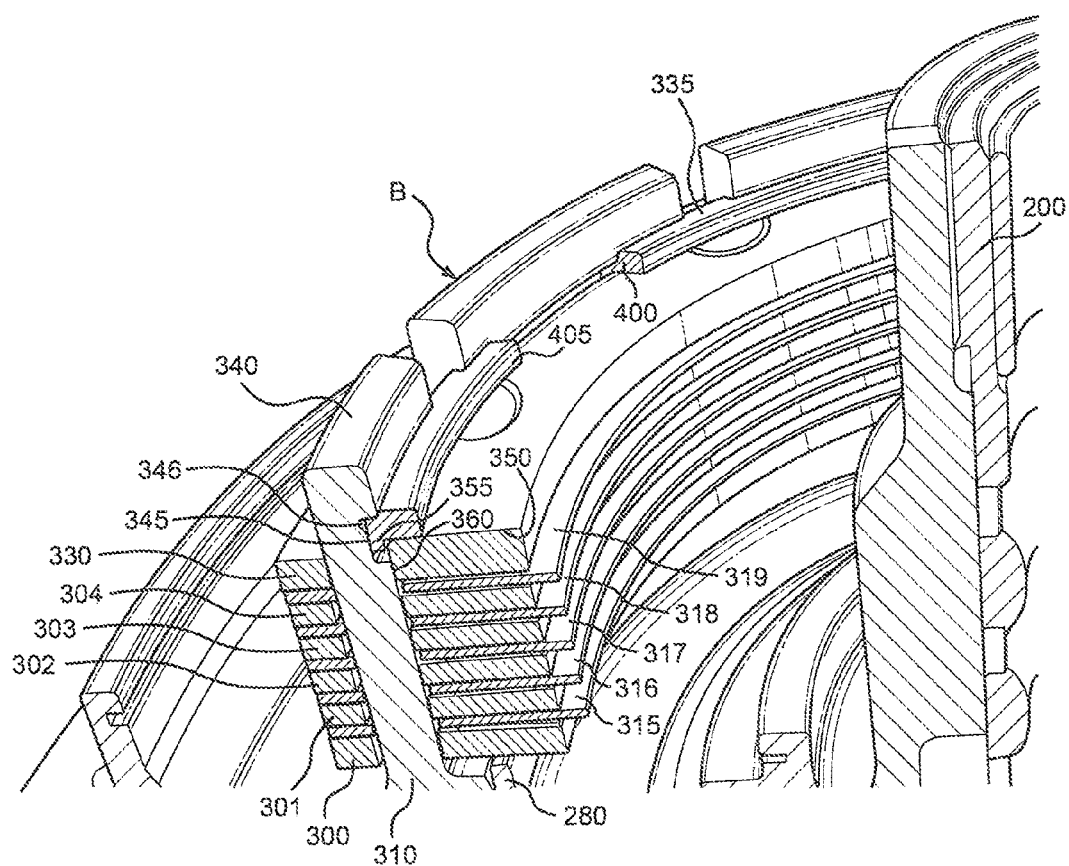
FIG. 5 is a perspective, cross-sectional view of the friction element assembly.

The pressure applied by piston assembly 280 to plates 300-304 and friction members 315-319 is also applied, in turn, to snap ring 335 and legs of brake housing 310, one of which is labeled 340 (also shown in FIG. 5). In order to reduce the stress caused by this pressure, a mounting groove 345, which receives snap ring 335, is relatively shallow. Additionally, mounting groove 345 includes a stress-relief groove 346 to further reduce the stress applied to legs 340 of brake housing 310. In a preferred embodiment, groove 345 is less than 2 mm deep and, more preferably, between 1.55 and 1.65 mm deep. In other brake or clutch arrangements, however, providing a shallower groove is not necessarily beneficial because the stress applied to the housing does not present a problem and a shallower groove means that it is easier for an associated snap ring to exit the groove.

For example, with reference to FIG. 2, it can be seen that none of brake A or clutches C, D, E or F has a housing running therethrough. Instead the housings are located at inner or outer peripheries of brake A and clutches C, D, E and F. As transmissions designs become increasingly complex, it is not always possible to arrange friction element assemblies in such a manner. In particular, and with reference to FIG. 3 once again, having brake housing 310 run through brake B means that brake housing 310 is divided into legs, such as leg 340. This arrangement reduces the strength of brake housing 310 as compared with housings for brake A and clutches C, D, E and F, which form unbroken circles. In situations where size constraints, for example, suggest having a housing formed as a broken circle, it has been found to be beneficial to provide stress reduction depending on the amount of stress exerted on the housing. For more detail concerning the arrangement of brake B, and transmission 110 generally, see U.S. patent application Ser. Nos. 14/178,937 and 14/178,979, which are hereby incorporated by reference in their entirety.

While the shallower depth of groove 345 reduces the stress applied to housing 310, it also means that a smaller percentage of snap ring 335 is located within groove 345 as compared with an arrangement including a snap ring of the same size but a deeper groove. As a result, snap ring 335 is relatively more likely to be deformed by the forces applied by piston assembly 280 in a manner that could cause snap ring 335 to exit groove 345. In particular, repeatedly applying these forces can cause the portion of snap ring 335 not located within groove 345 to be bent rightward relative to FIG. 3. This would result in snap ring 335 taking on an angled or conical shape, thereby making it easier for snap ring 335 to exit groove 345. Additionally, since brake B does not rotate, there is no centrifugal force acting on snap ring 335 to help hold snap ring 335 in groove 345 during operation. Accordingly, in order to help retain snap ring 335 in mounting groove 345, snap ring 335 is L-shaped and groove 345 extends to the left, relative to FIG. 3, past an outer edge or face 350 of pressure plate 330. Thus, a leg portion 355 of snap ring 335 contacts an upper edge or peripheral surface 360 of pressure plate 330 when piston assembly 280 is actuated such that snap ring 335 does not bend in the manner described above. As a result, snap ring 335 will not exit groove 345 after installation.

In one preferred embodiment, the height of leg portion 355 (from top to bottom relative to FIG. 3) is between 1.3 and 1.5 mm, while the height of snap ring 335 (again from top to bottom) is between 4.7 and 4.9 mm. The width of leg portion (from left to right) is between 1.0 and 1.2 mm. More generally, the height of leg portion 355 is preferably between 20 and 50% of the overall height of snap ring 335, and the width of leg portion 355 is preferably between 50 and 100% of the width of the portion of snap ring 335 not including leg portion 355. As discussed above, the depth of groove 345 is preferably less than 2 mm. In the preferred embodiment where the height of leg portion 355 is between 1.3 and 1.5 mm, the depth of groove 345 is between 1.45 and 1.75 mm, and more preferably between 1.55 and 1.65 mm. In other embodiments, the height of leg portion 355 is generally less than or equal to the depth of groove 345 such that leg portion 355 does not interfere with movement of pressure plate 330.

In order to install snap ring 335 within groove 345, plates 300-304, friction members 315-319 and pressure plate 330 are compressed to the left against the action of piston assembly 280 by an installation tool (not shown) in a manner known in the art. Once groove 345 is no longer covered by pressure plate 330, snap ring 335 is contracted, placed near groove 345 and allowed to expand such that it enters groove 345. Plates 300-304, friction members 315-319 and pressure plate 330 are then allowed to return to the position shown in FIG. 3 such that outer edge 350 of pressure plate 330 contacts snap ring 335. The contact between upper edge 360 and leg portion 335 that occurs when piston assembly 280 is actuated keeps snap ring 335 from deforming, which thereby prevents snap ring 335 from exiting groove 345.

Although described as an upper edge 360, it should be understood that upper edge 360 could also be a lower edge in another embodiment. For example, if the present invention were applied to clutch F (shown in FIG. 2), it would be a lower edge of clutch F's pressure plate that contacted clutch F's snap ring. Broadly speaking, edge 360 is adjacent to mounting groove 345 and generally parallel to a longitudinal axis of transmission 110, while edge 350 meets upper edge 360 at snap ring 335 and is generally perpendicular to the longitudinal axis of transmission 110. For the purposes of this discussion, "generally parallel" and "generally perpendicular" should be construed as encompassing deviations of up to +/−15 degrees. "Substantially parallel" and "substantially perpendicular" should be construed as encompassing deviations of up to +/−5 degrees due to the limitations inherent in manufacturing and assembling any article.

Figure 4:
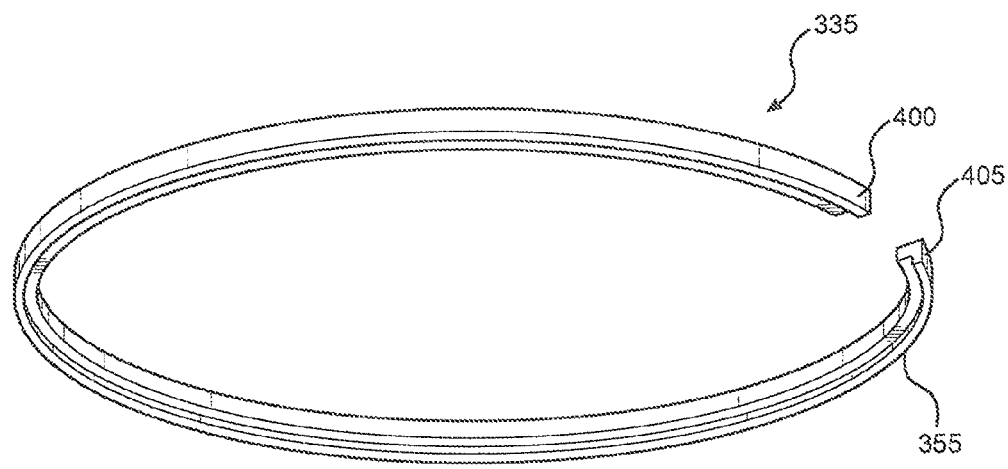
FIG. 4 is a perspective view of a snap ring of the friction element assembly.

FIG. 4 shows a perspective view of snap ring 335 and its leg portion 355. Additionally, a first end 400 and a second end 405 of snap ring 335 are visible. The gap between first and second ends 400 and 405 is what enables snap ring 335 to contract. FIG. 5 shows a perspective view of brake B including piston assembly 280, plates 300-304, friction members 315-319, pressure plate 330, housing 310, housing leg 340, snap ring 335 and groove 345. Additionally, input 200 is shown. However, brake drum 325 and one-way clutch 210 are omitted for clarity. Groove 345 runs through an inner surface of each leg of housing 310 (one of which is labeled 340). As discussed above, because housing 310 is divided into legs, it is weaker than a housing formed as a complete circle and, accordingly, groove 345 is relatively shallow in order to reduce the stress applied to legs 340 of housing 310. Since groove 345 is relatively shallow, it is possible for snap ring 335 to be deformed by the forces applied by piston assembly 280. Therefore, in accordance with the invention, snap ring 335 is provided with leg portion 355, which keeps snap ring 335 from deforming and thereby prevents snap ring 335 from exiting groove 345 once installed.

Based on the above, it should be readily apparent that the present invention provides a friction element assembly design that reduces stress on a housing thereof by providing a shallow mounting groove and also prevents a snap ring thereof from exiting the groove once the snap ring has been installed. Although described with reference to preferred embodiments, it should be readily understood that various changes or modifications could be made to the invention without departing from the spirit thereof. For example, the friction element assembly can be a clutch or a brake. Additionally, the present invention can be used with a wide range of transmissions. In general, the invention is only intended to be limited by the scope of the following claims.

The invention claimed is:

1. A motor vehicle comprising:
a power source;
a driveshaft; and
a transmission configured to drivingly interconnect the driveshaft to the power source, said transmission having a friction element assembly including:
a set of plates and friction members;
a piston assembly configured to apply a force to the set of plates and friction members;
a housing including a mounting groove;
a pressure plate including a first surface and a second surface; and
a snap ring positioned in the mounting groove such that the first surface of the pressure plate contacts the snap ring and the second surface of the pressure plate extends across a portion of the snap ring, whereby the snap ring is prevented from exiting the mounting groove after installation, wherein the portion of the snap ring across which the second surface of the pressure plate extends defines a leg portion that contacts the second surface of the pressure plate when the piston assembly applies a force to the set of plates and friction members.

2. The motor vehicle of claim 1, wherein the snap ring is L-shaped.

3. The motor vehicle of claim 1, wherein:
the first surface of the pressure plate is generally perpendicular to a longitudinal axis of the transmission; and
the second surface of the pressure plate is adjacent to the mounting groove and generally parallel to the longitudinal axis of the transmission.

4. The motor vehicle of claim 1, wherein the mounting groove is less than 2 mm deep.

5. The motor vehicle of claim 4, wherein the mounting groove is between 1.55 and 1.65 mm deep.

6. The motor vehicle of claim 1, wherein the housing is divided into a plurality of legs, and the mounting groove is formed in an inner surface of each of the plurality of legs.

7. The motor vehicle of claim 6, wherein the set of plates and friction members includes a plurality of plates and a plurality of friction members, and the plurality of legs extends through the plurality of plates.

8. The motor vehicle of claim 1, wherein:
the leg portion of the snap ring is generally parallel to a longitudinal axis of the transmission;
the snap ring includes a non-leg portion generally perpendicular to the longitudinal axis of the transmission; and
the first surface of the pressure plate contacts the non-leg portion of the snap ring.

9. A friction element assembly comprising:
a set of plates and friction members;
a piston assembly configured to apply a force to the set of plates and friction members;
a housing including a mounting groove;
a pressure plate including a first surface and a second surface; and
a snap ring positioned in the mounting groove such that the first surface of the pressure plate contacts the snap ring and the second surface of the pressure plate extends across a portion of the snap ring, whereby the snap ring is prevented from exiting the mounting groove after installation, wherein the portion of the snap ring across which the second surface of the pressure plate extends defines a leg portion that contacts the second surface of the pressure plate when the piston assembly applies a force to the set of plates and friction members.

10. The friction element assembly of claim 9, wherein the snap ring is L-shaped.

11. The friction element assembly of claim 9, wherein:
the friction element assembly is located in a transmission of a motor vehicle;

the first surface of the pressure plate is generally perpendicular to a longitudinal axis of the transmission; and the second surface of the pressure plate is adjacent to the mounting groove and generally parallel to the longitudinal axis of the transmission.

12. The friction element assembly of claim 9, wherein the mounting groove is less than 2 mm deep.

13. The friction element assembly of claim 12, wherein the mounting groove is between 1.55 and 1.65 mm deep.

14. The friction element assembly of claim 9, wherein:

the snap ring includes a non-leg portion generally perpendicular to the leg portion of the snap ring; and the first surface of the pressure plate contacts the non-leg portion of the snap ring.

15. A friction element assembly comprising:

a set of plates and friction members;

a piston assembly configured to apply a force to the set of plates and friction members;

a housing including a mounting groove, wherein the housing is divided into a plurality of legs, and the mounting groove is formed in an inner surface of each of the plurality of legs;

a pressure plate including a first surface and a second surface; and a snap ring positioned in the mounting groove such that the first surface of the pressure plate contacts the snap ring and the second surface of the pressure plate extends across a portion of the snap ring, whereby the snap ring is prevented from exiting the mounting groove after installation.

16. The friction element assembly of claim 15, wherein the set of plates and friction members includes a plurality of plates and a plurality of friction members, and the plurality of legs extends through the plurality of plates.

* * * * *